United States Patent [19]

Story

[11] Patent Number: 4,648,428
[45] Date of Patent: Mar. 10, 1987

[54] SHIRRED TUBULAR MATERIAL

[75] Inventor: Alfred D. Story, Danville, Ill.

[73] Assignee: Teepak, Inc., Oak Brook, Ill.

[21] Appl. No.: 684,517

[22] Filed: Dec. 21, 1984

[51] Int. Cl.⁴ ............................................. F16L 11/10
[52] U.S. Cl. ...................................... 138/118.1; 17/45
[58] Field of Search ............................ 17/45; 138/118.1; 426/105, 135, 138, 140

[56] References Cited

U.S. PATENT DOCUMENTS

| | | | |
|---|---|---|---|
| 2,010,626 | 8/1935 | Dietrich | 17/36 |
| 2,722,714 | 11/1955 | Blizzard et al. | 17/42 |
| 2,722,715 | 11/1955 | Blizzard et al. | 17/49 |
| 2,723,201 | 11/1955 | Blizzard et al. | 138/118.1 |
| 2,819,488 | 1/1958 | Gimbel | 17/42 |
| 2,984,574 | 5/1961 | Matecki | 138/118.1 |
| 3,266,911 | 8/1966 | Clement | 17/49 |
| 3,397,069 | 8/1968 | Urbutis et al. | 138/118.1 |
| 3,454,982 | 7/1969 | Arnold | 17/42 |
| 3,456,286 | 7/1969 | Martinek | 17/49 |
| 3,461,484 | 8/1969 | Arnold | 17/49 |
| 3,704,483 | 12/1972 | Urbutis et al. | 17/49 |
| 3,779,284 | 12/1973 | Tums | 17/42 X |
| 3,869,756 | 3/1975 | Tums | 17/49 |
| 3,907,003 | 9/1975 | Regner et al. | 138/118.1 |
| 4,001,914 | 1/1977 | Riegler et al. | 17/42 |
| 4,200,960 | 5/1980 | Kollross | 17/42 |
| 4,210,981 | 7/1980 | Story | 17/45 |
| 4,377,885 | 3/1983 | Kollross | 17/42 |
| 4,487,231 | 12/1984 | Wolf et al. | 138/118.1 |

Primary Examiner—Stephen Marcus
Assistant Examiner—Mark Thronson
Attorney, Agent, or Firm—Michael L. Dunn; William J. Crossetta

[57] ABSTRACT

A shirred tubular material comprising a plurality of outer folds which when the tubular material is opened are arranged along at least two substantially parallel, longitudinally extending helixes. A method for forming the disclosed shirred tubular material is disclosed which comprises sequentially applying shirring forces through two or more sets of shirring elements wherein each successive member of a set applies shirring forces along a different continuous line than its immediate preceding member. The tubular material may contain reinforcing fibers.

18 Claims, 7 Drawing Figures

SHIRRED TUBULAR MATERIAL

FIELD AND BACKGROUND OF THE INVENTION

This invention relates to the art of shirring flexible tubular material. More particularly, it relates to a method of shirring tubular material which provides a unique shirring pattern, thus enabling the production of a higher density, commercially acceptable shirred tubular product.

DESCRIPTION OF THE PRIOR ART

In the manufacture and use of flexible tubular materials, particularly tubular materials utilized to encase food products in the food industry, there is an increasing need to shirr such tubular materials along the longitudinal axis to allow ease in subsequent handling. Shirring is a process which involves the gathering of the tubular material along its longitudinal axis in such manner as to maintain a clear passage through the interior of the tubing and thus significantly reduce the handling size of long lengths of tubular material without detrimentally impeding passage through the tube.

In the food products industry, the shirring of tubular materials used to encase meat and processed food such as cheese or other types of food products is particularly necessary in that it allows a convenient method of filling, particularly in the manufacture of tubular food products including sausages such as frankfurters, pork sausages and the like. Shirred tubular materials such as food casings and particularly sausage casings are commercially desired to possess properties in which the ratio of the length of the unshirred casing to that of the shirred casing (the shirring density) is as great as possible without incurring damage to the tubing in the form of pinholing or otherwise. The length of shirred casing (shirred stick) should be as straight as possible with resistance to bending and breaking. The internal bore of the shirred stick should be of maximum diameter; and, the stick should be able to be inserted on and off the stuffing horn easily and readily.

In the practice of the best shirring art, e.g. U.S. Pat. No. 3,456,286 to high density shirring, tubing of an appropriate length, such as for example 40 to 160 feet (12.2–48.8 m), can be shirred to produce shirred casing sticks of a length of from about 4 to about 16 inches (10.2–40.6 cm) or more respectively. At high densities, i.e. 8 feet of casing per inch (0.96 m/cm) or more, defects, such as pinholing, were not uncommon. Such shirred casing sticks can be stuffed with meat or food product by manual or automatic operation. In a typical stuffing operation a closed end shirred stick is fitted onto a hollow stuffing horn which is interconnected with a stuffing supply source. The stuffing is injected, under pressure, through the stuffing horn into the shirred stick which deshirrs under the pressure of the stuffing thus filling the tubing to its original unshirred length. For reasons of economy and to speed up the stuffing operation it is commercially desirable to have a self-sustaining, durable, shirred stick, highly compressed in length, that is uniformly straight and has a large internal bore. Self-sustaining durability of the stick is necessary to prevent premature deshirring and ensure trouble free operation; high density permits stuffing of more product in a single stuffing operation; straightness is required to assure proper horn insertion particularly in automatic operation; and, bore size is important for maximizing the speed of stuffing at any given stuffing pressure. Each of these factors has importance in increasing the efficiency of the stuffing process and is a demand of the industry to offset increasing labor and machinery costs.

The shirring of sausage casing is typically achieved by a common method which comprises gathering of the casing on a guide element (shirring mandrel) extended longitudinally through the bore of the casing. Typically, the casing is pushed together in an axial direction on the shirring mandrel by means of shirring elements applied to the circumference of the casing which grip the periphery of the casing and transport it axially against a controlled yielding buffer to effect folding of the casing. U.S. Pat. No. 2,010,626 discloses a method of shirring wherein the shirring elements are crimping fingers, disposed one behind the other, which are moved in the direction of the axis of the sausage casing for effecting a crimping action and forming the shirred product, much in the manner as the fingers of a hand shirring operation. U.S. Pat. Nos. 2,722,714; 2,722,715; and 2,723,201 to Blizzard et al improve the shirring process by inflating the casing over a hollow shirring mandrel and shirr by contacting shirring elements in the form of shirring lugs carried on endless belts each comprising a set of shirring elements. The shirring lugs are staggered so that the space opposite any given contacting shirring lug is free from application of shirring forces. U.S. Pat. Nos. 3,461,484 and 3,454,982 describe a process and apparatus for shirring sausage casing wherein three sets of shirring elements in the form of three rotating shirring wheels, containing individual member element shirring lugs cut into a helical curve, act as crimping fingers sequentially engaging the periphery of inflated casing in a substantially helical line of contact so that the casing is indented in a single helical line and formed into a single continuous helical pleat. The patent describes the process as a sequential application of shirring forces to the periphery of the casing and progressing longitudinally of the casing along a helical line.

The shirring of casing sequentially along a helical line has proved to be of major commercial importance to the industry and has been the subject of multiple patents. U.S. Pat. No. 3,779,284 comprises a method of achieving a reverse single helical fold pattern which involves counter rotationally displacing neighboring zones of single helical line pleats from preceding neighboring zones. The reverse helical fold process has not enjoyed wide commercial success. U.S. Pat. No. 4,377,885 describes a shaftless gear device utilized in the axial spin head shirring of synthetic tubular casing for achieving a single helical line shirr pattern. This device is particularly adapted for shirring by formation of a continuous helical fold in accord with the process of U.S. Pat. No. 3,461,484. In the shaftless gear device, sets of shirring elements in the form of shirring rolls, containing a plurality of member shirring elements in the form of shirring teeth are arranged in an assembly comprising at least four rolls. The rolls are distributed in a plane transverse to a mandrel axis, equiangularly about a central opening adapted to receive the cylindrical mandrel. The shirring rolls are mounted in such manner that engagement of the shirring teeth, with inflated tubular casing mounted on the cylindrical mandrel, is staggered such as to successively engage the casing in a common zone of engagement. The entire apparatus spins, and the teeth of the shirring rolls sequentially engage the inflated casing so as to continually indent and fold the casing in a single continuous helical line.

DESCRIPTION OF THE INVENTION

It is an object of the instant invention to provide novel shirred tubular material having high shirring density with a low frequency of defects, self-sustaining durability, end-to-end straightness and a large interior bore. This object is achieved by a process for shirring tubular materials, in particular sausage casing wherein casing is conveyed in the direction of its longitudinal axis and is shirred, with pleating, against a counterforce by means of a shirring element exerting shirring forces which act upon the periphery of the casing. By shirring element is meant the individual shirring tooth, paddle or lug of a shirring wheel, roll or endless belt respectively of a shirring apparatus. By set of shirring elements is meant the combined shirring elements contained in a single shirring wheel, roll, endless belt or similar device in a shirring apparatus. By shirring force is meant a force, having a component along the longitudinal axis of the tube, which force indents and/or acts to compress the tubing to form at least part of a pleat. The counterforce acts in part to form a pleat and usually comprises controlled advancement of previously shirred casing, which advancement is in the same direction as the casing being shirred.

In the process of this invention, shirring forces are sequentially and repeatedly applied to the periphery of the tube through two or more sets of shirring elements. Each member element of each set of shirring elements applying shirring forces along a different continuous helical line than its immediate preceding member element. Thus, the process comprises sequentially applying shirring forces by means of two or more sets of shirring elements progressively and continuously longitudinally in two or more substantially helical lines along the periphery of the casing, each member element of each set of shirring elements being applied along a different continuous helical line than its immediate preceding member but parallel thereto. The product formed by such process will contain shirred pleats along at least two helical lines, though the configuration of the helical lines can vary considerably. Thus, the helical line configurations can be close together or apart from each other or any combination thereof. For example, using the process of the invention in an apparatus comprising two sets of shirring elements wherein every member element of each set is transversely configured the same and the same as every other member element of the other set, a shirred casing containing two helical lines can be formed by timing the application of shirring forces of every other member of one set to the helical line formed by application of shirring forces of every other conforming member of the other set. Depending upon the angle of the transverse configuration (pitch) of the conforming members and the distance therebetween, the characteristics of the formed helical lines can be modified. Thus, for example, the angle of the helical line to the axis can be modified by modification to pitch while the density of members, sets, and pitch combine to establish the number of helical lines formed. Similarly, three sets of shirring elements can be aligned to form two or more parallel helical lines. The preferred embodiment is one wherein two or more parallel helical lines are formed by two, three or four sets of shirring elements having the same transverse configuration.

The shirred product of the invention is a densely shirred tubular material having a central, interior axial bore and a substantially cylindrical outer surface, said shirred tubular material comprising a plurality of outer folds which when the tubular material is opened are arranged along at least two longitudinal extending helixes.

When the configuration is adjusted to form parallel helixes, the shirring process causes the formation of a plurality of intermediate folds, essentially all of which are intermittent, arranged at an angle to the longitudinal axis of the casing and randomly oriented. By randomly oriented is meant that the intermediate folds are not arranged in a clearly continuous arrangement along a helical line nor are they arranged in a pattern which intersects opposing points of defined shaped patterns. Such random orientation is distinct from the orientation of various prior art shirred casings such as one embodiment of U.S. application Ser. No. 547,817, filed Nov. 1, 1983 wherein intermediate folds are in patterned arrangement.

Tubular material which can be so shirred comprise substantially any flexible material, sufficiently thin walled, which can withstand the shirring forces without being destroyed. Typical flexible materials used for food casings may be comprised of natural and synthetic polymers, plastics, proteins, carbohydrates and the like such as collagen, alginates, starches or cellulosic materials such as cellulose esters, cellulose ethers and regenerated cellulose, as well as other natural, synthetic or artificial materials.

Figure 2:
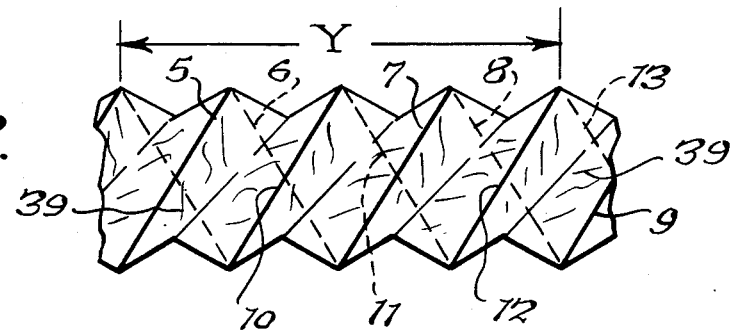
FIG. 2 is a representation of a shirring arrangement comprising a dual, parallel helical configuration of the shirred tubular material embodying this invention.
Figure 2A:
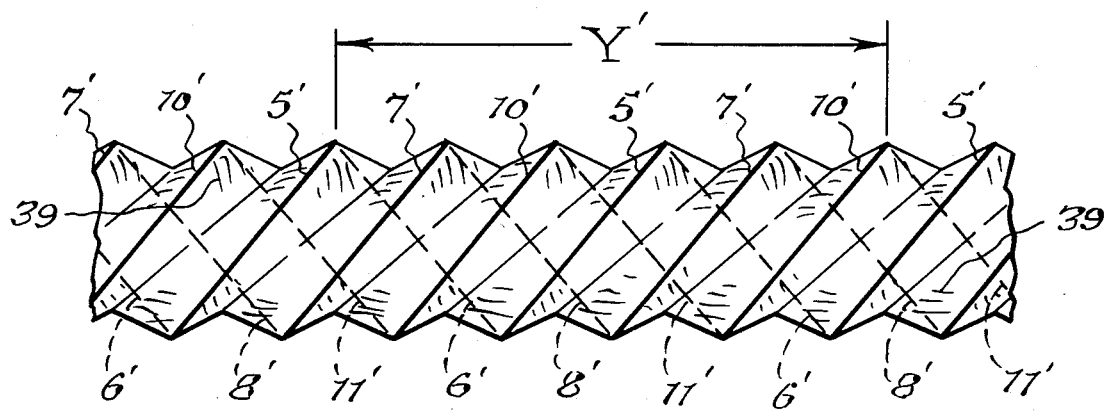

FIG. 2a is a representation of a shirring arrangement comprising a triple, parallel helical configuration of the shirred tubular material embodying this invention. Zone Y' contains a first pleat comprising outer folds 5', 6' (dotted line), a second pleat comprising outer folds 7', 8' (dotted line) and a third pleat comprising outer folds 10' and 11' (dotted line).

Figure 4:
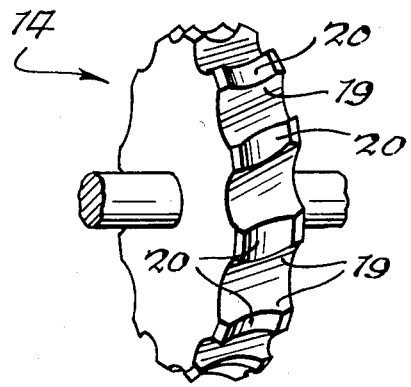
Figure 3:
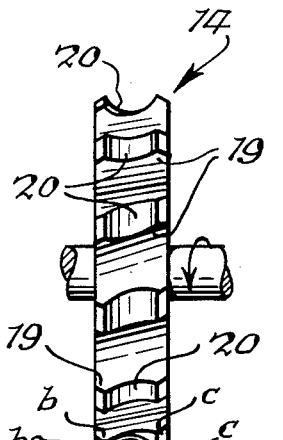
Figure 3:
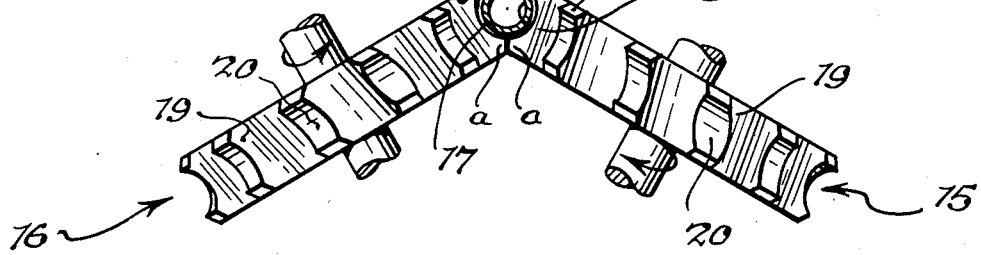
Figure 5:
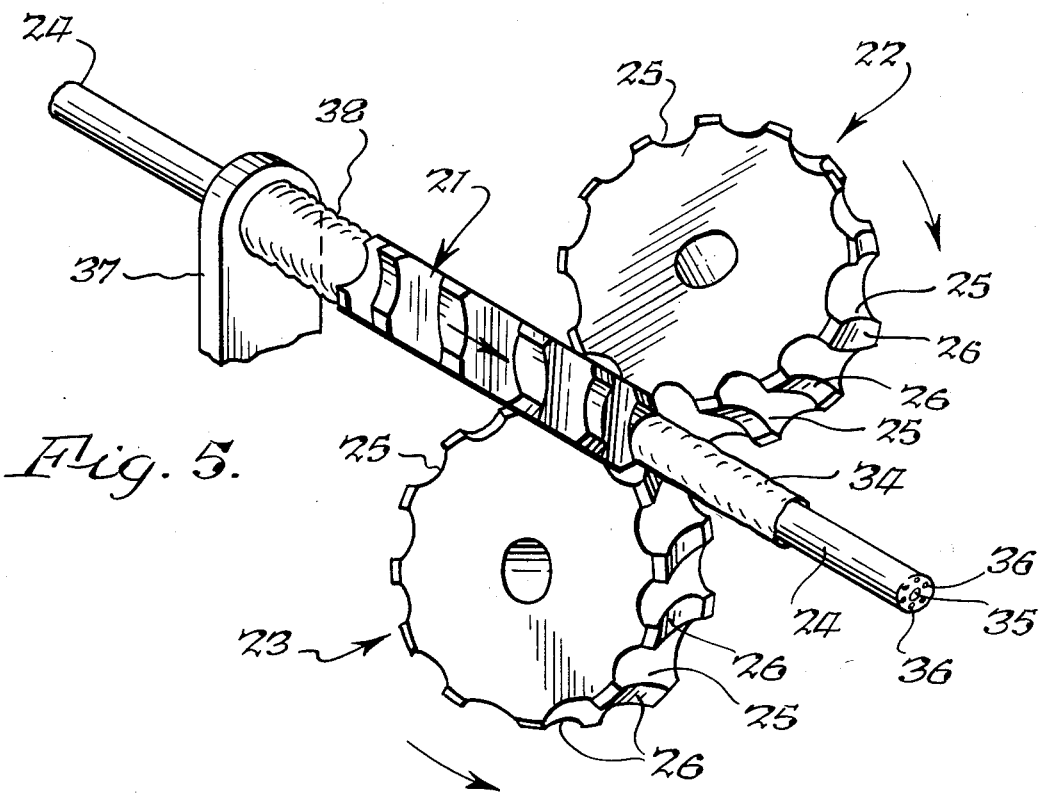
Figure 6:
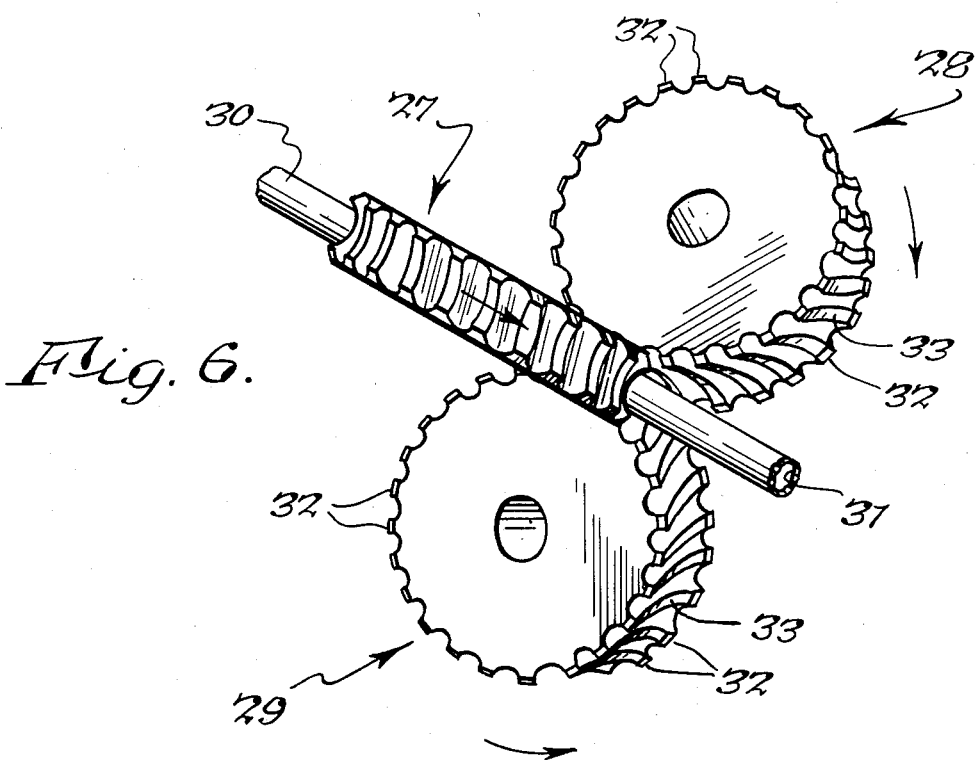

FIG. 3 is a frontal view of a prior art wheel shirring head configured to achieve a single continuous helical line pleat;

FIG. 4 is a perspective view of a single wheel of the prior art;

FIG. 5 is a frontal sectional view of a three wheel shirring head equipped with modified pitch shirring elements to achieve a dual, parallel helical configured embodiment of the invention; and FIG. 6 is a partial sectional view of a three wheel shirring head having the same pitch as the shirring elements of FIG. 3, but configured to achieve a dual, parallel helical line of the invention.

In one embodiment of the invention there is provided an elongate, durably self-sustaining shirred stick of tubular material having high shirr density. The outer peripheral surface is substantially cylindrical and visually appealing comprising a closely compacted patterned appearance. The internal bore is substantially straight from end to end of the stick. Such shirred stick can be prepared using a plurality of the shirring devices disclosed in the prior art modified to effect contact on tubular material along two or more helical lines in accord with the process of this invention. It is the indentation of the tubing, along two or more continuous helical lines, on the peripheral surface of the tubing, which is believed upon lonitudinal shirring compression against the counterforce forms the unique, helical pleats of the invention.

Figure 1:
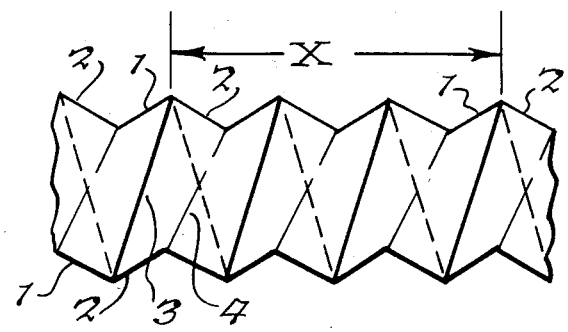
FIG. 1 is a representation of the shirring arrangement created by helical line shirring of the prior art.

Referring now to FIG. 1, wherein the shirring pattern of the prior art is represented, Zone X represents an expanded section of a shirred and compressed casing stick in accord with the process and device of U.S. Pat. Nos. 3,461,484 and 3,454,982, utilizing the shirring head of FIG. 3 with shirring elements configured in a single helical line pitch. Therein, each pleat comprises outer fold 3 and inner fold 4, joined through pleat sides 1 and 2. Inner fold 4 is formed by the successive indentive engagement of shirring lugs or teeth along the helical line depicted as the inner fold. Engagement along the helical line is achieved by continuously engaging the lugs about the casing while continuously advancing the casing through the point of engagement. Outer fold 3 is substantially parallel to inner fold 4 and is formed by compressing the indented casing axially against a buffer.

FIG. 2 represents the shirring pattern of a double parallel helical line embodiment of the instant invention where the shirred casing is in an open position. Therein, Zone Y represents an expanded section of a shirred and compressed casing stick in accord with the process of the invention utilizing the device of FIG. 5 with shirring elements set at a double parallel helical line pitch. Therein, one pleat comprises outer folds 5, 6 (dotted line), 7, 8 (dotted line) and 9, and the other pleat comprises outer folds 10, 11 (dotted line), 12 and 13 (dotted line). Each pleat is formed concurrently with each other by the successive circumferential engagement of alternating shirring lugs or teeth of alternating shirring wheels along the same helical line as the casing is continuously advancing through the points of engagement. The formation of each of the continuous outer folds occurs without rotation of the casing. Upon compression against the counterforce, the casing folds along the parallel helical lines as to intermesh in the direction of the compression thus adding greatly to the durability and end-to-end straightness of the stick. Compression also causes the formation of longitudinally angled, intermittent, intermediate folds 39 which randomly intersect the helixes formed by the outer folds without defining a continuous helix along the shirred length and without a patterned connecting of opposing points of shaped patterns.

FIG. 3 represents the typical single continuous helical line apparatus utilized in the prior art (U.S. Pat. No. 3,454,982). Therein three shirring wheels 14, 15 and 16 are positioned equiangularly around a shirring mandrel 17. Shirring mandrel 17 can be hollow as indicated at 18 for introduction of compressed air and/or lubricant within the casing being shirred on the mandrel. Each shirring wheel, also represented individually in FIG. 4, has an equal number of shirring lugs or teeth (Elements) 19, which are substantially equally spaced and have a cylindrical shirring surface 20 as indicated. The shirring lugs 19 are each set at an angle in relation to the shirring mandrel and also at an angle (pitch) in relation to the peripheral movement of the wheels. The angle of the shirring lug is such that as the wheels are sucessively rotated the lugs mate successively and define a substantially continuous forming helical surface for application of shirring forces to the casing being shirred.

Thus, it is seen that as the shirring wheels are rotated in the direction of the directional arrows, the shirring lugs will meet in a substantially helical pattern. In FIG. 3, the portion of shirring lugs 19 which are labeled (a) are in a mating position. As the rotation of the wheels continues the portion labeled (b) will mate and upon further rotation the portion labeled (c) will mate. Thus, it can be seen that the rotation of the shirring wheels causes the angularly set lugs to mate in a substantially continuous single helical pattern to produce the shirring arrangement of FIG. 1.

FIG. 5, represents the configuration of a three shirring wheel apparatus modified to produce an embodiment of the invention wherein shirring occurs along two parallel helixes in accord with FIG. 2. As with FIG. 3, three shirring wheels 21, 22 and 23 are positioned equiangularly around a shirring mandrel 24 which also can be hollow containing air inflation tube 35 and lubricant tubes 36. Each shirring wheel has an even plurality of shirring lugs 25 which are substantially equally spaced and have a cylindrical shirring surface 26 as indicated. The shirring lugs 25 are each set at an angle in relation to the peripheral movement of the wheels, which angle is greater than the angle of the lugs in FIG. 3. The angle of the shirring lugs is such that as the wheels are successively rotated in the direction of the directional arrows, a lug of every progressing wheel mates with the casing on the same helical line. The next lug on every progressing wheel mates with a casing on a second helical line. The third lug of every progressing wheel mates with a casing on the first helical line. The fourth lug on every progressing wheel mates with the casing on the second helical line. Thus, alternating helical lines are engaged by alternating lugs on every progressing wheel. If the wheels are designed with an even number of lugs, then an individual lug is associated with the same helical line on every revolution of the wheel. If the wheels are designed with an odd number of lugs, then an individual lug is associated with alternating helcial lines on every revolution of that wheel. From the aforesaid it can be seen that the rotation of the shirring wheels causes the angularly set lugs to progressively mate in two parallel, substantially continuously helical line patterns to produce the shirred arrangement of FIG. 2.

FIG. 6 represents the configuration of another embodiment of the invention wherein shirring occurs along two parallel helixes in accord with FIG. 2. As with FIGS. 3 and 5, three shirring wheels 27, 28 and 29 are positioned equiangularly around a shirring mandrel 30 which also can be hollow as indicated at 31. Each shirring wheel has an even plurality of shirring lugs 32 which are substantially equally spaced and have a cylindrical shirring surface 33 as indicated. The shirring lugs 32 are each set at an angle (pitch) in relation to the peripheral movement of its wheels, which is the same as the angle of the lugs in FIG. 3, but the distance between the lugs is reduced such that as the wheels are successively rotated in the direction of the directional arrows, adjacent lugs of every wheel mate with the casing on a different helical line as the preceding lug and never mate with the casing on the same helical line as the preceding lug. Thus, the number of lugs in the wheel will be twice that number utilized by an equivalent prior art wheel of FIG. 3, and adjacent lugs, on each wheel, mate with the casing on alternating helical lines. It can be seen that the rotation of the shirring wheels in the direction of the arrows thus causes the angularly set lugs to progressively mate in two parallel, substantially continuous helical line patterns to produce the shirred arrangement of FIG. 2.

Referring back now to FIG. 5, in accord with the process of the invention but utilizing drive apparatus as described in U.S. Pat. No. 3,456,286 with shirring wheels configured in accord with the invention of this application regenerated cellulose casing 34 having an average thickness of 1 mil, is fed, in the direction of the arrow, from casing reel supply means (not shown) and passed over hollow mandrel 24. The casing is inflated and lubricated by introduction of air through air inflation tube 35 and lubricant tubes 36 and fed between shirring wheels 21, 22 and 23, and the mandrel. As explained previously, the shirring wheels are rotated by syncronomous rotating means (not shown) in the direction of the arrows to cause the shirring lugs 25 to engage the surface of the casing such that every other lug of every progressing wheel mates with the casing on the same helical line, and the next array of every other lug of every progressing wheel mates with the casing on a second helical line so that the casing is progressively indexed along two parallel helical lines and then when compressed against buffer means 37 forms the shirred casing 38 comprising two parallel helical pleats as indicated in FIG. 2. The resulting double parallel helical line shirred casing 38 has a density of 10 feet/inch (1.2 m/cm) and is resistant to breakage.

What is claimed is:

1. A method for shirring synthetic sausage casings comprising sequentially applying shirring forces through at least two sets of shirring elements, each set comprising a plurality of successively arranged member shirring elements, progressively and continuously longitudinally in two or more substantially parallel, helical lines along the periphery of the casing, each successive member shirring element of each set applying shirring forces along a different helical line than that helical line of the immediate preceding successive member shirring element of the set.

2. The method of claim 1 wherein three sets of shirring elements apply shirring forces along two substantially parallel helical lines.

3. The method of claim 2 wherein said three sets of shirring elements apply shirring forces along three substantially parallel helical lines.

4. The method of claim 1 wherein two sets of shirring elements apply shirring forces along two substantially parallel helical lines.

5. The method of claim 1 where four to six sets of shirring elements apply shirring forces along two to four helical lines.

6. The method of claim 1 wherein the shirred density of the shirred casing is over 5 ft/in.

7. The method of claim 6 wherein the shirred density of the shirred casing is from 8–12 ft/in.

8. The method of claim 1 wherein the sausage casing comprises collagen.

9. The method of claim 1 wherein the sausage casing comprises regenerated cellulose.

10. The method of claim 9 wherein the casing contains reinforcing fibers.

11. The method of claim 1 wherein the casing comprises a thin walled plastic.

12. A shirred tubular material having a hollow central axial bore and a substantially cylindrical outer surface, said shirred tubular material comprising a plurality of outer folds which when the tubular material is opened are continuously arranged along at least two substantially parallel, longitudinally extending repetitively equidistant, helixes, a plurality of randomly oriented intermediate folds, intersecting said helixes, essentially all of which are intermittent along the shirred length and which do not connect opposing points of shaped patterns, and a plurality of inner folds which are continuously arranged along at least two substantially parallel, longitudinally extending, repetitively equidistant, helixes, and wherein each of said plurality of inner folds has a characteristic pattern, and wherein said patterns are similar.

13. The shirred tubular material of claim 12 comprising regenerated cellulose.

14. The material of claim 13 containing reinforcing fibers.

15. The material of claim 12 comprising collagen.

16. The material of claim 12 comprising thin walled plastic.

17. The shirred tubular material of claim 12 wherein the shirr density is over 5 ft/in.

18. A shirred tubular material having a hollow central axial bore and a substantially cylindrical outer surface, said shirred tubular material comprising a plurality of outer folds which when the tubular material is opened are continuously arranged along at least two substantially parallel, longitudinally extending, repetitively equidistant, helixes, a plurality of randomly oriented intermediate folds, intersecting said helixes, essentially all of which are intermittent along the shirred length and which do not connect opposing points of shaped patterns, and a plurality of inner folds which are continuously arranged along at least two substantially parallel, longitudinally extending, repetitively equidistant helixes, and wherein said outer folds are arranged along three helixes.

* * * * *